United States Patent [19]

Jeong

[11] Patent Number: 5,434,949
[45] Date of Patent: Jul. 18, 1995

[54] SCORE EVALUATION DISPLAY DEVICE FOR AN ELECTRONIC SONG ACCOMPANIMENT APPARATUS

[75] Inventor: Tae-hwa Jeong, Kwangmyeong, Rep. of Korea

[73] Assignee: Samsung Electronics Co., Ltd., Kyungki-do, Rep. of Korea

[21] Appl. No.: 105,957

[22] Filed: Aug. 13, 1993

[30] Foreign Application Priority Data

Aug. 13, 1992 [KR] Rep. of Korea .................... 92-15202

[51] Int. Cl.6 .......................... G10L 9/00; G09B 15/02
[52] U.S. Cl. .................................... 395/2.79; 84/477 R
[58] Field of Search .......................... 84/477 R, 470 R; 395/2.79, 2.81, 2.4; 381/41

[56] References Cited

U.S. PATENT DOCUMENTS 4,546,690 10/1985 Tanaka et al. .................... 84/477 R
5,208,413 5/1993 Tsumura et al. .................... 84/615
5,287,789 2/1994 Zimmerman .................... 84/477 R
5,300,723 4/1994 Ito .................... 84/601

Primary Examiner—Allen R. MacDonald
Assistant Examiner—Michael A. Sartori
Attorney, Agent, or Firm—Sughrue, Mion, Zinn, Macpeak & Seas

[57] ABSTRACT

A score evaluation display device for an electronic song accompaniment apparatus has an audio signal processing unit to evaluate a user's singing. A sampling processor samples the difference between an input song signal from a microphone and reference song signal, a volume deference detector detects a voltage difference between these two signals, a rhythm difference detector detects the difference in rhythm between these two signals, and an adder sums the outputs of the volume difference detector and the rhythm difference detector, thereby producing a finally evaluated score. Accordingly, a more reliable and accurate evaluation can be performed for a user's singing, based on the difference between the microphone's input song signal and the reference song signal.

6 Claims, 2 Drawing Sheets

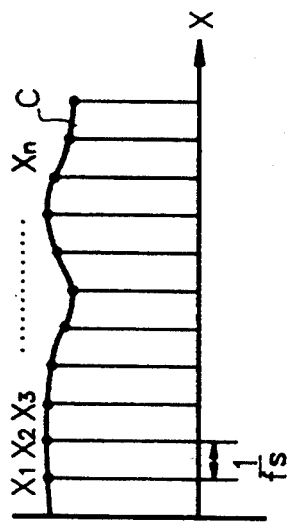
FIG. 2A
FIG. 2B
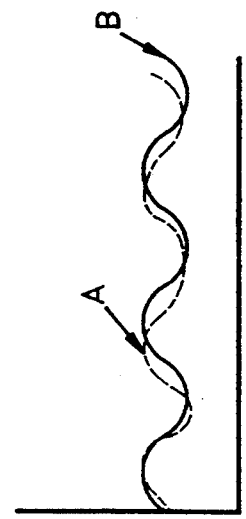
FIG. 3
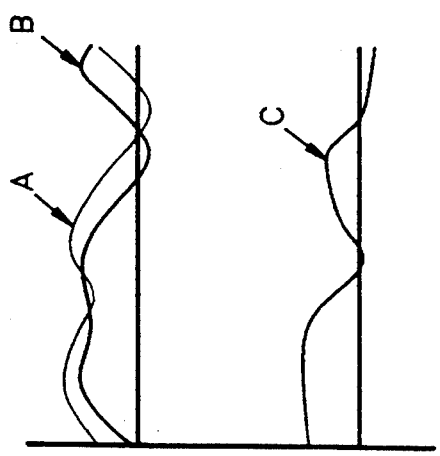
FIG. 4
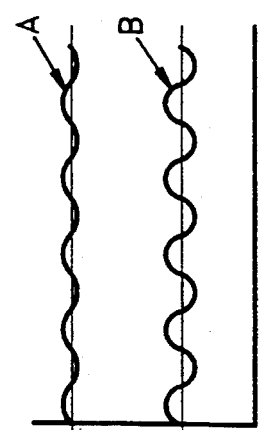
FIG. 5

SCORE EVALUATION DISPLAY DEVICE FOR AN ELECTRONIC SONG ACCOMPANIMENT APPARATUS

BACKGROUND OF THE INVENTION

1. Field of the Invention

The present invention relates to a score evaluation display device for an electronic song accompaniment device of an audio signal processing apparatus, and more particularly, to a score evaluation display device for evaluating a user's singing.

2. Description of the Related Art

In general, an audio signal processing device reproduces an audio signal recorded on a recording medium or records an externally input signal on the recording medium, and includes such devices as a cassette recorder, a compact disk system, a laser disk player and a karaoke system. Among these, laser disk players and karaoke systems, both of which include an imaging device and a music accompaniment device permit a user to enjoy a variety of music according to preference. In particular, the user can sing along with the accompaniment by means of an input device, i.e., a microphone.

The score evaluation display device for an electronic song accompaniment device compares the song, as sung by the user, with the reproduced signal, by way of an above audio signal processing device, to thereby evaluate the singing of the user and display an evaluated score. Conventional score evaluation display devices are limited in that the evaluation scores are not accurate. In other words, conventional score evaluation display devices for an electronic song accompaniment device lack objectivity in evaluation, and thus the resulting score is not accurately based on the user's singing ability.

SUMMARY OF THE INVENTION

To solve the above-described problems, the object of the present invention is to provide a score evaluation display device for an electronic song accompaniment device which can display reliable evaluation scores by detecting the difference between the user's singing and the reproduced signal based on both rhythm and volume.

To accomplish the above object, the present invention provides a score evaluation display device for an electronic song accompaniment device for displaying the evaluation score by detecting a difference between an input song signal and a previously recorded reference song signal. The device has a sampling processor for sampling the thus-detected difference signal at a predetermined sampling frequency and thereby producing a sampling signal and a volume difference detector for accumulating the sampling signal therein and detecting a difference in volume according to the accumulation. A rhythm difference detector detects the difference between the sampling signal and a delayed sampling signal and thereby detects a difference in rhythm between the input song signal and the reference song signal and an adder sums a value output from the volume difference detector and a value output from the rhythm difference detector to produce a finally evaluated score.

BRIEF DESCRIPTION OF THE DRAWINGS

The above objects and other advantages of the present invention will become more apparent by describing in detail a preferred embodiment thereof with reference to the attached drawings in which:

FIG. 2A shows input and reference signal waveforms of the device shown in FIG. 1;

FIG. 2B shows a waveform output by the first subtractor;

FIG. 3 shows sampling waveforms of the device shown in FIG. 1;

FIG. 4 shows the level difference between an input signal and a reference signal; and FIG. 5 shows the rhythm difference between input and reference signals.

DETAILED DESCRIPTION OF THE PREFERRED EMBODIMENT

Figure 1:
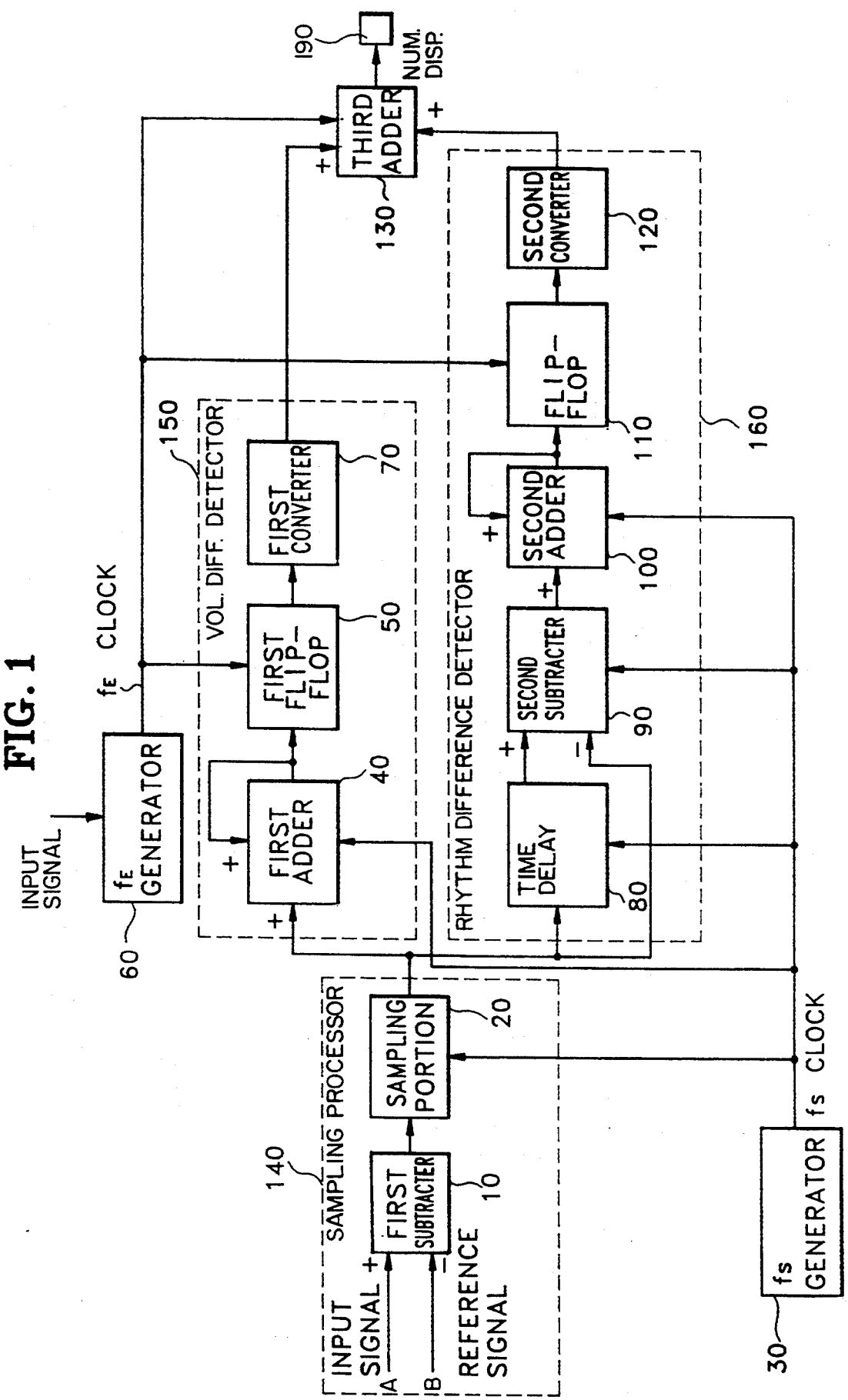
FIG. 1 is a block diagram showing a score evaluation display device for an electronic song accompaniment apparatus according to a preferred embodiment of the present invention.

The present invention will be described, hereinafter, via a preferred embodiment thereof and with reference to the attached drawings.

Referring to FIG. 1, a sampling processor 140 comprises a first subtracter 10 for producing the difference between the reference song signal, which represents a desired vocal track, and the input song signal, which is transmitted via a microphone, and a sampling portion 20 for sampling the output signal of first subtractor 10 in accordance with the sampling frequency $f_S$ of a sampling signal output from frequency generator 30.

A volume difference detector 150 comprises a first adder 40 for receiving the sampled data, a flip-flop 50 for transmitting the output value of first adder 40, and a first converter 70 for converting the value of flip-flop 50 to a desired value.

A rhythm difference detector 160 comprises a time delay 80 for delaying the output data of sampling portion 20 by $1/f_S$ and thereby producing a delayed sampling signal, a second subtracter 90 for obtaining the difference between the data output from sampling portion 20 and the data output from time delay 80, a second adder 100 for receiving the data output from second subtracter 90, a flip-flop 110 for receiving the output value of second adder 100 and then transmitting the same according to the synchronization clock signal $f_E$ output by frequency generator 60, and a second converter 120 for converting the output data of the flip-flop 110 to the desired value. A third adder 130 sums the value output from first converter 70 and the value output from second converter 120.

Frequency generator 30 generates a sampling frequency $f_S$ and is connected to first adder 40, time delay 80, second subtracter 90 and second adder 100, respectively. Frequency generator 60 produces a logic high signal, upon the completion of the input signal, which is input to flip-flop 50 and the flip-flop 110 as well as third adder 130. In response to this signal, the flip-flops output the accumulated values of first adder 40 and second adder 100, respectively, and then are reset. It should be noted that flip-flops 50 and 110 can be parallel switching arrays, serial time based switches, or the like, as is appropriate.

Referring to FIGS. 2 to 5, A indicates the input song signal from a microphone, B indicates the reference song signal, and C indicates the output signal of first subtracter 10.

A score evaluation display means according to the present invention as constructed above performs a sample-processing operation of the difference between the user-generated input song signal and the reference song signal, to thereby periodically detect this difference, by which a reliable evaluation score can be produced. The production of an evaluation score will be described in detail below.

First, the operation of sampling processor 140 will be described. The positive terminal of first subtracter 10 receives the input song signal A from a microphone, and the negative terminal thereof receives the reference song signal B. Here, the input song signal via the microphone is a signal which represents the song sung by the user and the reference song signal is a recorded vocal signal. First subtracter 10 receives the two input song signals A and B in the form of analog signals as shown in FIG. 2A, and then produces a signal whose waveform is a difference signal C between the two signals as in FIG. 2B. Next, sampling portion 20 samples the output signal of first subtracter 10 at a sampling frequency $f_S$ and converts the difference signal C into a digital form of sampling signals $x_1, x_2, \ldots, x_n$ which are illustrated in FIG. 3. Referring to FIG. 3, the space, or time, between each sampling signal is the inverse of the sampling frequency $f_S$, that is, $1/f_S$.

The operation of volume difference detector 150 will be described. The first adder 40 receives the output data of sampling portion 20 and thereby accumulates the received data therein continuously in a memory while being synchronized by clock signal $f_S$. In other words, $x_1$ through $x_n$ are summed, or totaled, in the first adder 40 and the accumulated total is stored in a memory of the first adder 40.

When the entire input signal is input (i.e., the song is over), generator 60 produces the signal $f_E$. For example, generator 60 can produce the signal $f_E$ when the input signal is below a certain level for a predetermined period of time. First flip-flop 50 then couples first adder 40 to first converter 70 to transmit the summed data from first adder 40 to first converter 70. First converter 70 converts the data transmitted by first flip-flop 50 to a proper evaluation value. This conversion can be accomplished based on a predetermined algorithm or a look-up table stored in the first converter 70.

FIG. 4 illustrates the possible difference in voltage levels between a input signal and the reference signal. Typically, first converter 70 is configured to output an evaluation value which is inversely proportional to the summed data value from first adder 40. A greater difference between signals A and B causes a higher input to first converter 70, and thus the output from first converter 70 becomes smaller. That is, the evaluation value becomes lower according to the singing volume of the user. On the contrary, as the difference between signals A and B becomes smaller, the input to first converter 70 gets smaller, which thereby increases the output of first converter 70, meaning a higher evaluation value based on the singing volume of the user.

Next, the operation of the difference rhythm detector 160 will be described. The time delay 80 is synchronized by clock signal $f_S$ which is output from frequency generator 30 and delays sampling signals $x_1, x_2, x_3, \ldots x_n$, output from sampling portion 20, by $1/f_S$. The delayed signal sampling signal is then inputted to the positive terminal of the second subtracter 90.

The second subtracter 90 determines the difference between two input data values from the positive and negative terminals thereof, i.e, it calculates the difference between the sampling signal $x_1, x_2, x_3, \ldots x_n$ from sampling portion 20 and the delayed sampling signal from the time delay 80, and then outputs the difference to the second adder 100. If the difference between the $1/f_S$-delayed signal and the sampling signal is small, the sampling signal is essentially constant over time, which therefore means that the two signals input to the second subtracter 90 are roughly equivalent.

Second adder 100 sums all of the differences for each sampling signal and accumulates a summed value in a memory thereof. When the flip-flop 110 receives signal $f_E$, which indicates the end of a song, it transmits the accumulated output value of second adder 100 to second converter 120. Second converter 120 converts the data transmitted by flip-flop 110 to a desired value. Second converter 120 is similar to first converter 70 but may have a different algorithm or look-up table associated therewith.

FIG. 5 shows the rhythm difference between the input signal and the reference signal, over time. The first subtractor 10 produces a difference signal which represents the difference between the input signal A and the reference signal B. The second subtractor 90 outputs a difference signal which represents the difference between the sampled signal generated by sampling portion 20 and a delayed sample signal output by time delay 80. As the difference between the sampled signal and the delayed sample signal increases, the input to second converter 120 increases and, as a result, the output of second converter 120 decreases. Therefore, the score with respect to the user's rhythm decreases. On the contrary, as the difference between the sampling and delayed sampling signals, becomes smaller, input to second converter 120 decreases, the output to second converter 120 becomes higher, and accordingly, the score with respect to the user's rhythm increases.

Third adder 130 sums the output values of first converter 70 and second converter 120, which means that the third adder sums two scores which correspond to the user's volume and rhythm, respectively. Here, the maximum output of third adder 130 is set to 100. If the volume and rhythm of an input song signal transmitted via a microphone are the same as those of the reference song signal, the output of third adder 130 will be 100.

The output signal of the third adder 130 is then displayed on a number display 190.

As described above, the score evaluation display means according to the present invention detects a level difference between a microphone-input signal and the reference signal to obtain an evaluation value based on volume, and detects a difference in time variance between a sampled signal and a delayed sampled signal to obtain an evaluation value based on rhythm. The sum of these two scores is then displayed via a display device. Accordingly, in the present invention, a more reliable and accurate evaluation can be performed.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A score evaluation display device for an electronic song accompaniment apparatus which displays an evaluation score by detecting the difference between an input song signal transmitted via a user-audio input device, and a reference song signal, said display device comprising:

sampling processor means for detecting the difference between said input song signal and said reference song signal to produce a difference signal, for sampling the difference signal at a predetermined sampling frequency and for producing a sampling signal which has various values over time;

volume difference detector means for accumulating the values of said sampling signal therein for a predetermined period of time to generate an accumulated value so as to detect a volume difference based on the accumulated value and for determining a first evaluation value based on said volume difference;

rhythm difference detector means for delaying said sampling signal to produce a delayed sampling signal and for accumulating therein a difference between said sampling signal and said delayed sampling signal, and for detecting a rhythm difference based on said sampling signal and said delayed sampling signal and for determining a second evaluation value based on said rhythm difference; and first adder means for summing said first and second evaluation values to thereby produce a finally evaluated score, wherein said volume difference detector means comprises a first means for summing the values of the sampling signal and outputting a sum, a first switch device for transmitting the sum when an end signal, which indicates the end of the predetermined period of time, is output from an end clock generator and a first converter for converting the sum to obtain said first evaluation value.

2. The score evaluation display means as claimed in claim 3 wherein said sampling processor means comprises a first subtracter for obtaining the difference between said user-input song signal and said reference song signal and outputting a difference signal, and a sampling portion for sampling the difference signal output from said first subtracter.

3. The score evaluation display device as claimed in claim 1, wherein said first converter comprises a look-up table.

4. A score evaluation display device for an electronic song accompaniment apparatus which displays an evaluation score by detecting the difference between an input song signal transmitted via a user-audio input device, and a reference song signal, said display device comprising:

sampling processor means for detecting the difference between said input song signal and said reference song signal to produce a difference signal, for sampling the difference signal at a predetermined sampling frequency and for producing a sampling signal which has various values over time;

volume difference detector means for accumulating the values of said sampling signal therein for a predetermined period of time to generate an accumulated value, so as to detect a volume difference based on the accumulated value and for determining a first evaluation value based on said volume difference;

rhythm difference detector means for delaying said sampling signal to produce a delayed sampling signal and for accumulating therein a difference between said sampling signal and said delayed sampling signal, and for detecting a rhythm difference based on said sampling signal and said delayed sampling signal and for determining a second evaluation value based on said rhythm difference; and first adder means for summing said first and second evaluation values to thereby produce a finally evaluated score, wherein said rhythm difference detector means comprises one-sample-delay means for delaying the sampling signal for a period which is the inverse of said sampling frequency to obtain the delayed sampling signal, a second subtracter for obtaining the difference between the sampling signal and the delayed sampling signal and outputting a rhythm difference signal having values which vary over time, a second means for summing the values of the rhythm difference signal output from said second subtracter and outputting a rhythm sum, a second switch device for transmitting the rhythm sum when one end signal, which indicates the end of said predetermined period of time, is received from an end clock generator and a second converter for converting the rhythm sum to obtain said second evaluation value.

5. The score evaluation display means as claimed in claim 4, wherein said sampling processor means comprises a first subtractor for obtaining the difference between said user-input song signal and said reference song signal and outputting a difference signal, and a sampling portion for sampling the difference signal output from said first subtractor.

6. The score evaluation display device as claimed in claim 4, wherein said second converter comprises a look-up table.

* * * * *